United States Patent
Chae et al.

(10) Patent No.: US 7,858,014 B2
(45) Date of Patent: Dec. 28, 2010

(54) APPARATUS FOR FABRICATING FLAT PANEL DISPLAY DEVICE METHOD OF FABRICATING THE SAME AND METHOD OF FABRICATING FLAT PANEL DISPLAY DEVICE USING THE SAME

(75) Inventors: Gee Sung Chae, Incheon-si (KR); Gyoo Chul Jo, Gyeonggi-do (KR); Jin Wuk Kim, Gyeonggi-do (KR); Chang Hee Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 779 days.

(21) Appl. No.: 11/477,783

(22) Filed: Jun. 30, 2006

(65) Prior Publication Data
US 2007/0152372 A1    Jul. 5, 2007

(30) Foreign Application Priority Data
Dec. 29, 2005    (KR) .................... 10-2005-0133533

(51) Int. Cl.
    *B29C 59/00*    (2006.01)
(52) U.S. Cl. ........................... 264/293; 264/220

(58) Field of Classification Search ................ 264/320, 264/220, 293
See application file for complete search history.

(56) References Cited

U.S. PATENT DOCUMENTS

| 7,329,619 B2 * | 2/2008 | Kim et al. ................ 438/782 |
| 2004/0002216 A1 * | 1/2004 | Taussig et al. ............. 438/694 |

OTHER PUBLICATIONS

Definition of "thin film transistor" obtained at http://searchcio-midmarket.techtarget.com/sDefinition/0,,sid183_gci214176,00.html and published in 2001.*

* cited by examiner

*Primary Examiner*—Kat Wyrozebski
*Assistant Examiner*—Robert J Grun
(74) *Attorney, Agent, or Firm*—Morgan, Lewis & Bockius LLP

(57) ABSTRACT

An apparatus for fabricating a flat panel display device includes a device that applies a flowable material on a substrate; a soft mold having a base surface, a groove part recessed in relation to the base surface, and a protruding part protruding from the base surface, the soft mold applying a pressure on the flowable material for forming a multi-stepped profile pattern in the flowable material.

4 Claims, 21 Drawing Sheets

APPARATUS FOR FABRICATING FLAT PANEL DISPLAY DEVICE METHOD OF FABRICATING THE SAME AND METHOD OF FABRICATING FLAT PANEL DISPLAY DEVICE USING THE SAME

This application claims the benefit of the Korean Patent Application No. P2005-0133533 filed on Dec. 29, 2005 which is hereby incorporated by reference.

BACKGROUND OF THE INVENTION

1. Field of the Invention

The present invention relates to a flat panel display device, and more particularly to an apparatus for fabricating a flat panel display device, a method of fabricating the same, and a method of fabricating a flat panel display device using the same. Although the present invention is suitable for a wide scope of applications, it is particularly suitable for simplifying a fabrication process of the flat panel display device by using a soft mold rather than a photolithography process to form a thin film pattern.

2. Description of the Related Art

In the current information-driven society, display devices have grown in importance because of the pervasiveness of visual information as a medium of communication. In this respect, cathode ray tubes (CRT) or Braun tubes, which have been at the mainstream of visual displays, have become less appealing because they are heavy and bulky.

Flat panel display devices, such as liquid crystal display LCD, field emission display FED, plasma display panel PDP, organic light emitting diode OLED, etc., have been introduced as alternatives to CRTs for integration in new electrical appliances because they are light, thin, small and short. Recent breakthroughs in research and development have lead to improvement in the mass productivity of these flat panel display devices to a point where the flat panel display devices have become viable replacement to CRTs in many fields of application.

The recent improvement in the mass production of flat panel display devices has particularly lead to the rapid development of large and high-resolution active matrix type liquid crystal display devices. Active matrix LCD devices provide good picture quality and consume little power. In an active matrix LCD device, a thin film transistor ("TFT") is used to drive a liquid crystal cell.

FIG. 1 is an exploded perspective view of a portion of an active matrix type liquid crystal display device in accordance with the related art. Referring to FIG. 1, the active matrix type LCD device has a color filter substrate 22 and a TFT array substrate 23 bonded with a liquid crystal layer 15 therebetween. The color filter substrate 22 includes an upper glass substrate 12, a color filter 13 and a common electrode 14 formed on a rear surface of the upper glass substrate 12. The color filter 13 has a color filter layer of red (R), green (G), blue (B) disposed to transmit a light of a specific range of wavelengths to display color images. A black matrix (not shown) is formed between the color filters 13 of adjacent R, G, and B colors. Alignment films (not shown) are formed on surfaces of the color filter substrate 22 and the array TFT substrate 23 facing the liquid crystal layer 15.

The TFT array substrate 23 includes a lower glass substrate 16. Data lines 19 and gate lines 18 cross each other to define cell areas in the front surface of the lower glass substrate 16. A pixel electrode 21 is formed at each of the cell areas defined the data line 19 and the gate line 18. TFTs 20 are formed at the crossings of the data lines 19 and the gate lines 18 in each of the cell areas. Each of the TFT 20 switches a data transmission path between the data line 19 and the pixel electrode 21 in response to a scan signal from the gate line 18, thereby driving the pixel electrode 21. An electric field is applied to the liquid crystal 15 to control the transmittance of light incident through the TFT array substrate 23.

A polarizer 11 is attached to a front surface of the upper glass substrate 12. A polarizer 17 is also attached to the rear surface of the lower glass substrate 16. The polarizers 17 and 11 polarize light for transmission in one direction onto the rear surface of the lower glass substrate 16 and the out of the front surface of the color filter substrate 22, respectively. In a TN mode LCD device, the polarizing directions of polarizers 11 and 17 cross each other at a 90° angle.

The fabrication of the active matrix type liquid crystal display device can be divided into substrate cleaning process, a substrate patterning process, a alignment film forming/rubbing process, a substrate bonding/liquid crystal injecting process, a mounting process, an inspection process, a repairing process, etc. In the substrate cleaning process, a cleaning solution is used to remove impurities contaminating the substrate surface of the LCD device. The substrate patterning process includes a color filter substrate patterning process and a TFT-array substrate patterning process. In the alignment film forming/rubbing process, an alignment film is spread over each of the color filter substrate and the TFT array substrate, and the alignment film is rubbed with a rubbing cloth, etc. In the substrate bonding/liquid crystal injecting process, a sealant is used to bond the color filter substrate 22 and the TFT array substrate 23, and a liquid crystal and a spacer are injected through a liquid crystal injection hole, and then a process of sealing the liquid crystal injection hole is performed. In the mounting process, a tape carrier package (hereinafter, referred to as "TCP"), on which an integrated circuit such as a gate drive integrated circuit or a data drive integrated circuit is mounted, is connected to a pad part on the substrate. The drive integrated circuit can also be directly mounted on the substrate by a chip-on-glass (hereinafter, referred to as "COG") method other than a tape automated bonding method using the foregoing TCP. The inspecting process includes an electrical inspection performed after forming the pixel electrode and the signal lines such as the data line and the gate line in the TFT array substrate; an electrical inspection performed after the substrate bonding/liquid crystal injecting process; and a macrography. The repairing process performs restoration for the substrate which is found repairable in the inspecting process. On the other hand, defect substrates which are found un-repairable in the inspecting process are disposed off as waste.

In the related art fabricating method of most flat panel display devices, including LCD devices, a thin film material deposited on the substrate is patterned by a photolithography process. The photolithography process involves a series of photo-processes including a photo-resist spreading process, a mask aligning process, an exposing process, a developing process and a cleaning process. However, the photolithography process requires a long time for completion, uses large amounts of photo-resist material and stripping solution, and requires expensive equipments, such as exposure equipment, etc. Thus, there is a need for a simpler thin film patterning process for the flat panel display device, which is faster, less wasteful, and cheaper than the related art photolithography process.

SUMMARY OF THE INVENTION

Accordingly, the present invention is directed to an apparatus for fabricating a flat panel display device, a method of fabricating the same, and a method of fabricating a flat panel display device using the same that substantially obviate one or more of the problems due to limitations and disadvantages of the related art.

An object of the present invention is to provide an apparatus and method for fabricating a flat panel display device that provides a simplified a fabrication process of the flat panel display device.

Another object of the present invention is to provide an apparatus and method for fabricating a flat panel display device that provides a thin film pattern having uniform thickness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for fabricating a flat panel display device includes a device that applies a flowable material on a substrate; a soft mold having a base surface, a groove part recessed in relation to the base surface, and a protruding part protruding from the base surface, the soft mold applying a pressure on the flowable material for forming a multi-stepped profile pattern in the flowable material.

In another aspect, a method of fabricating an apparatus for use in fabricating a flat panel display device includes forming a first photo-resist pattern on a substrate; exposing a portion of the substrate through a first hole provided through the first photo-resist pattern; forming a groove overlapped with the first hole in the substrate by partially removing the exposed portion of the substrate through the first hole; removing the first photo-resist pattern; forming a second photo-resist pattern having a smaller area than the first photo-resist pattern on the substrate excluding the groove; applying a forming material on the substrate including the groove and the second photo-resist pattern; hardening the forming material; and separating the hardened forming material from the substrate to form a soft mold with a multi-stepped profile, the soft mold having a base surface, a groove part recessed in relation to the base surface, and a protruding part protruding from the base surface.

In another aspect, a method of fabricating an apparatus for use in fabricating a flat panel display device includes forming a first photo-resist pattern on a substrate, the first photo-resist pattern having a hole for exposing a portion of the substrate; forming a second photo-resist pattern on the first photo-resist pattern, the second photo-resist pattern having a smaller area than the first photo-resist pattern; applying a forming material on the substrate including on the first and second photo-resist patterns and within the hole; hardening the forming material; and separating the hardened forming material from the substrate to form a soft mold with a multi-stepped profile, the soft mold having a base surface, a groove part recessed in relation to the base surface, and a protruding part protruding from the base surface.

In another aspect, a method of fabricating a flat panel display device includes applying a flowable material on a substrate; and putting a soft mold on the flowable material to form a multi-stepped profile pattern in the flowable material, the soft mold having a base surface, a groove part recessed in relation to the base surface, and a protruding part protruding from the base surface.

In another aspect, a method of fabricating a flat panel display device includes forming a black matrix which divides a cell area on a substrate; forming a color filter in the cell area divided by the black matrix; applying a flowable material on the color filter; forming a spacer concurrently with an overlay layer by putting a soft mold on the spread flowable material to form a multi-stepped profile pattern in the flowable material, the soft mold having a base surface, a groove part recessed in relation to the base surface, and a protruding part protruding from the base surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
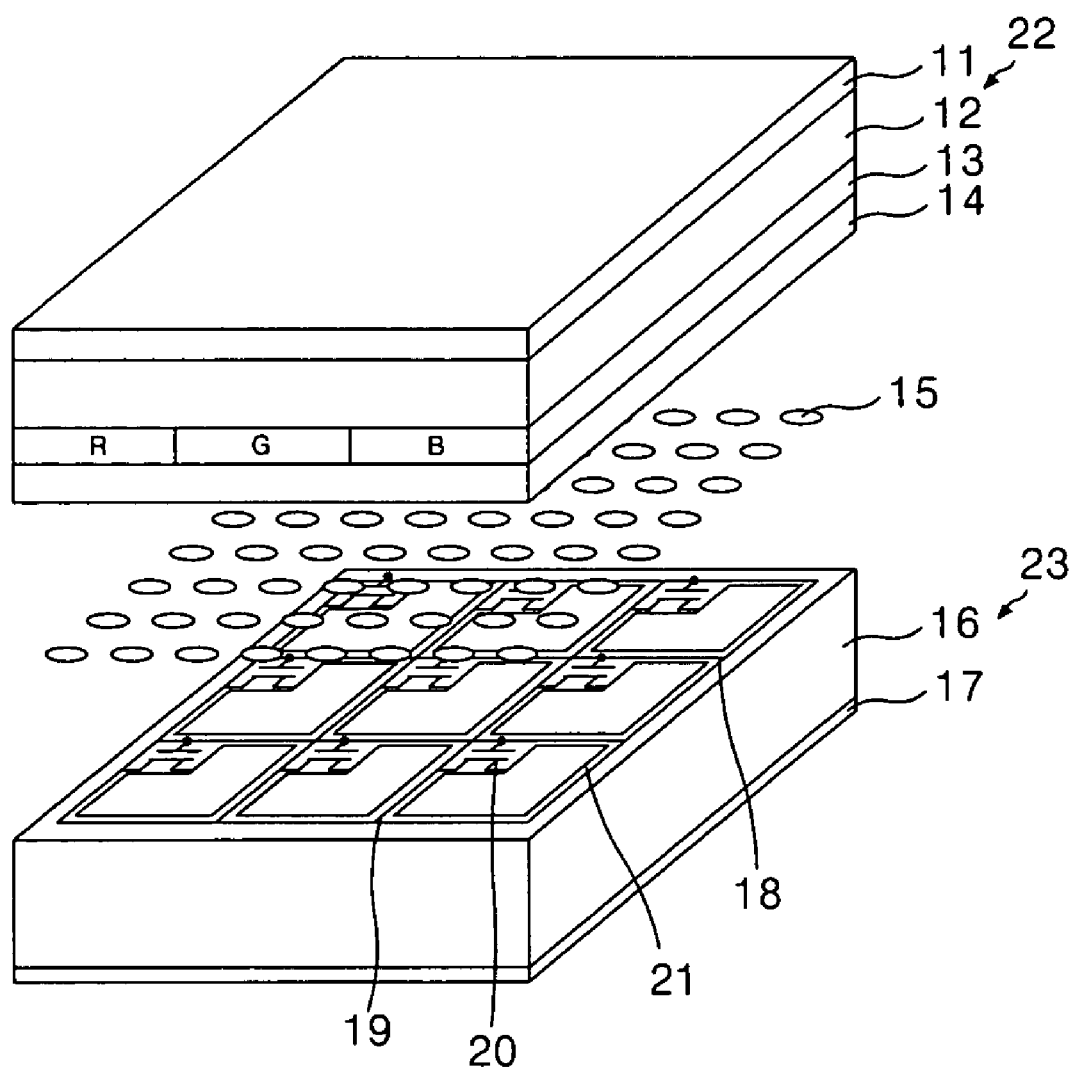
FIG. 1 is an exploded perspective view of a portion of an active matrix type liquid crystal display device in accordance with the related art.
Figure 2:
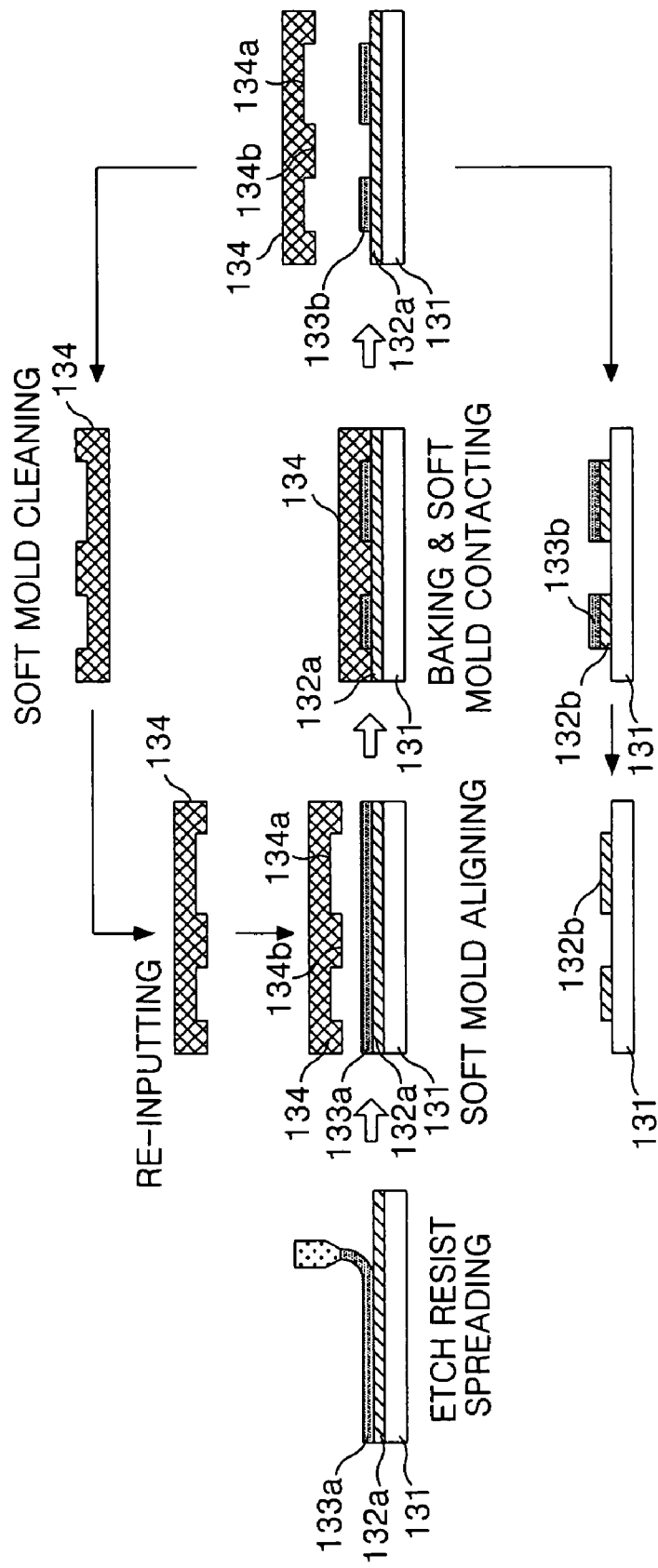
FIG. 2 is a diagram showing the use of a soft mold in an exemplary method of forming a thin film for a flat panel display device in accordance with an embodiment of the present invention.

FIG. 2 is a diagram showing the use of a soft mold in an exemplary method of forming a thin film for a flat panel display device in accordance with an embodiment of the present invention. Referring to FIG. 2, a soft mold 134 is used in a thin film patterning process to form a thin film pattern of a desired shape for a flat panel display device. In the thin film patterning process using the soft mold 134, a thin film 132a is formed over a substrate 131; an etch resist solution 133a is spread over a substrate 131 where a thin film 132a is formed; the etch resist layer 133a is patterned using the soft mold 134; then, an etching process is performed for patterning the thin film 132; the etching process is followed by a stripping process to remove a residual etch resist pattern; then the pattern is inspected.

A film 132a is deposited on the substrate 131. The film 132a can be a metal film, an organic film, or an inorganic film. The film 132a is formed on the substrate 131 by a known spreading process or deposition process. Then, an etch resist solution 133a is spread over the film 132a on the substrate 131. Then, the etch resist layer 133a is patterned using the soft mold 134;

The soft mold 134 is made from a rubber material with high elasticity, e.g., polydimethylsiloxane PDMS, polyurethane, cross-linked novolac resin, etc. A groove 134a is formed in the soft mold 134. The groove 134a corresponds to a pattern to be formed on the substrate 131. Herein, the soft mold 134 including the groove 134a and a surface 134b excluding the groove 134a can be surface-treated to be hydrophobic or hydrophilic.

The soft mold 134 is aligned on the etch resist solution 133a. Then, the soft mold 134 presses against the etch resist solution 133a under the soft mold's own weight to apply a pressure sufficient to bring the soft mold 134 in contact with the film 132a. Thus, the soft mold 134 is in a pressure-applying contact with the film 132a.

Figure 3:
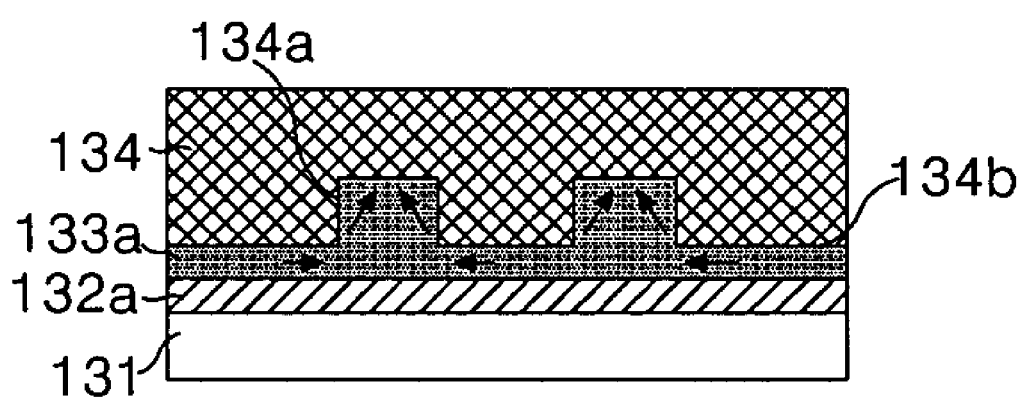
FIG. 3 is a diagram showing an exemplary movement of an etch resist solution when the soft mold contacts the substrate of FIG. 2.

FIG. 3 is a diagram showing an exemplary movement of an etch resist solution when the soft mold contacts the substrate of FIG. 2. Referring to FIG. 3, the soft mold 134 exerts a pressure on the etch resist 133a under the soft mold's own weight. The etch resist solution 133a moves into the groove 134a of the soft mold 134 due to a capillary force generated with a pressure between the soft mold 134 and the glass substrate 131 and a repulsive force between the soft mold 134 and the etch resist solution 132a. An etch resist pattern 133b (shown in FIG. 2) is formed on the thin film 132a resulting from a transfer of a pattern of an inverse shape from the groove 134a on the soft mold 134 to the etch resist layer 133a on the thin film 132a.

Then, the soft mold 134 is separated from the substrate 131, and a wet etching process or a dry etching process is carried out. The etch resist pattern 133b functions as a mask covering portions of the thin film 132a. Thus, exposed portions of the thin film 132a are removed by the etching process leaving only the thin film 132a covered by the etch resist pattern 133b. Subsequently, the etching resist pattern 134b is removed by a stripping process. Then, the thin film pattern 132b formed on the substrate 131 is inspected for the presence of short circuit, breakage of wire, etc. using an electrical and an optical inspection.

After separation from the substrate 131, the soft mold 134 is cleaned with ultraviolet ray UV and ozone $O^3$. Then, the cleaned soft mold 134 is re-used to form a pattern on another thin film 132a.

FIGS. 4A to 4D are diagrams showing exemplary steps of using a soft mold to form a spacer and an overcoat layer on a substrate of a flat panel display device in accordance with another embodiment of the present invention. Referring to FIGS. 4A to 4D, a spacer 113 and an overcoat layer 107 are concurrently formed by a patterning process using a soft mold.

Figure 4A:
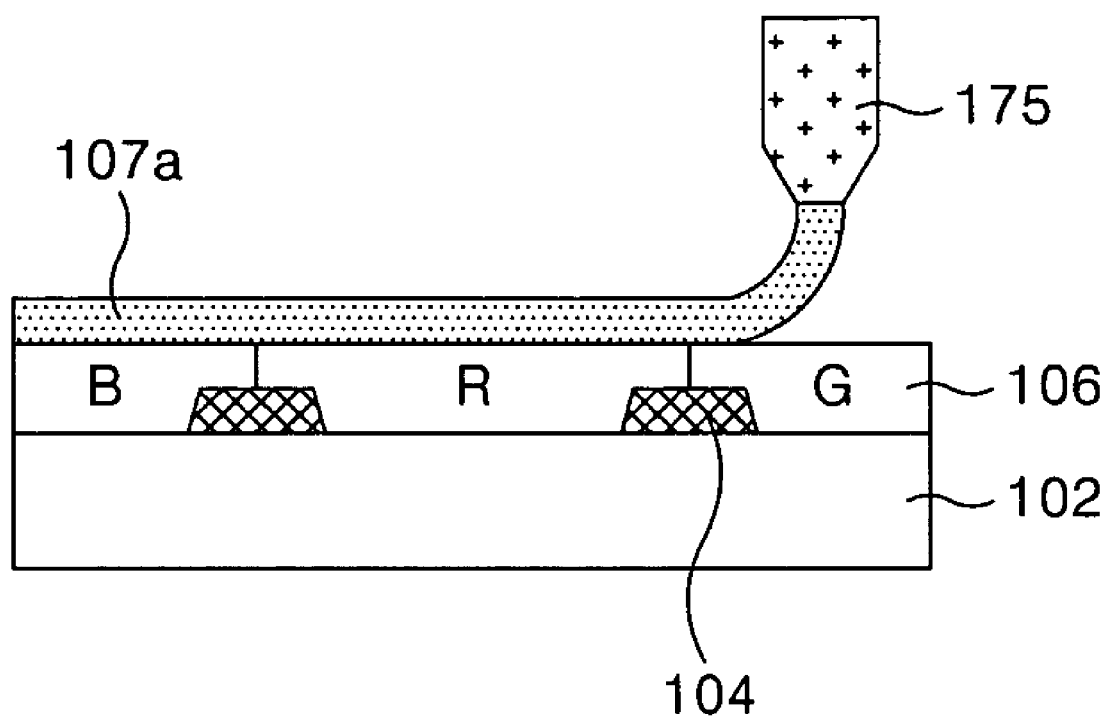
FIGS. 4A to 4D are diagrams showing exemplary steps of using a soft mold to form a spacer and an overcoat layer on a substrate of a flat panel display device in accordance with another embodiment of the present invention.

Referring to FIG. 4A, a flat panel display device includes an upper substrate 102, red (R), green (G) and blue (B) color filters 106 on the upper substrate 102, and a black matrix 104 between adjacent cell areas covered by the R, G, and B color filters. A flowable material 107a, such as an organic material, is spread over the R, G, and B color filters including the black matrix 104. The flowable material 107a is spread by a method such as spin coating using a spreading device 175.

Figure 4B:
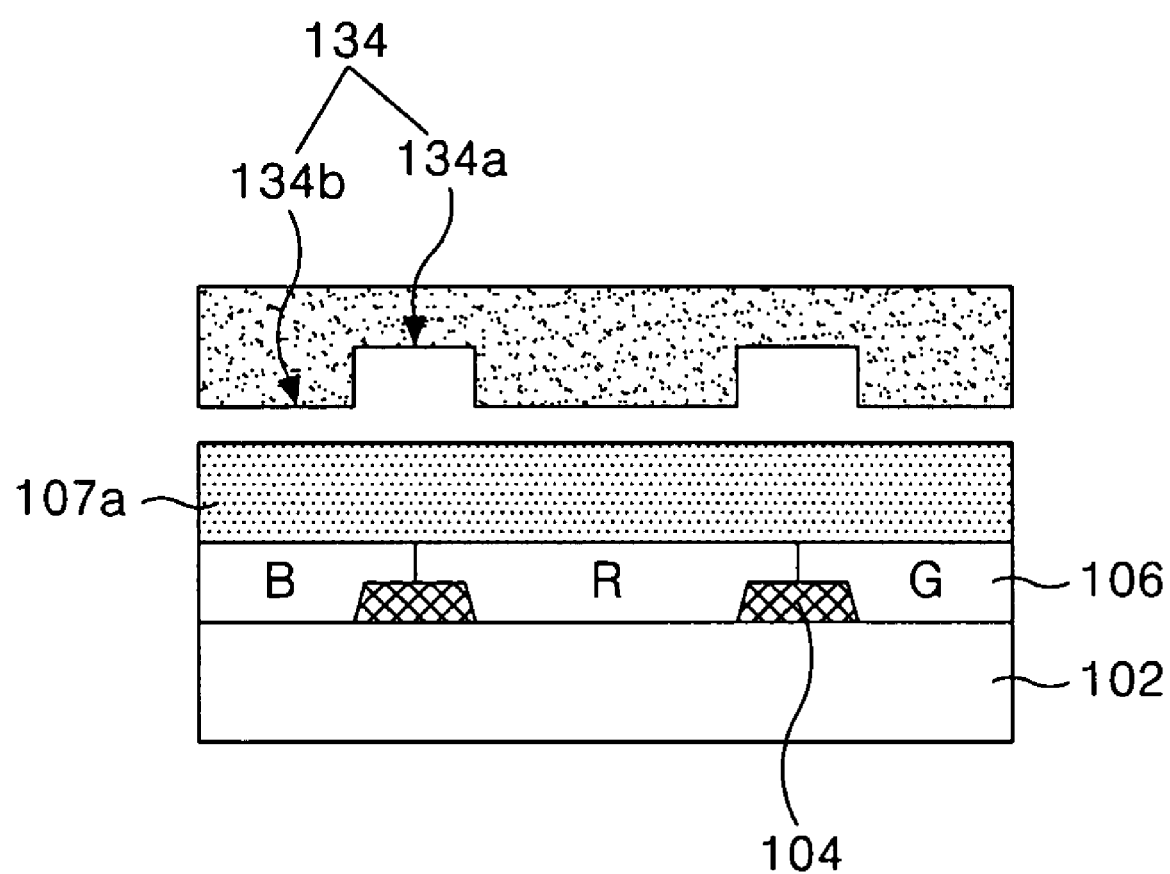

Referring to FIG. 4B, the soft mold 134 has a groove 134a recessed in relation to a surface 134b of the soft mold 134. The soft mold 134 is aligned with the substrate 102 over the flowable material 107a. The groove 134a of the soft mold 134 corresponds to an area where the spacer is to be formed. The soft mold 134 is made from a rubber material with high elasticity, e.g., polydimethylsiloxane PDMS, etc. The soft mold 134 presses against the flowable material 107a under its own weight during a designated time period. Then, the upper substrate 102 is baked at a high temperature.

Figure 4C:
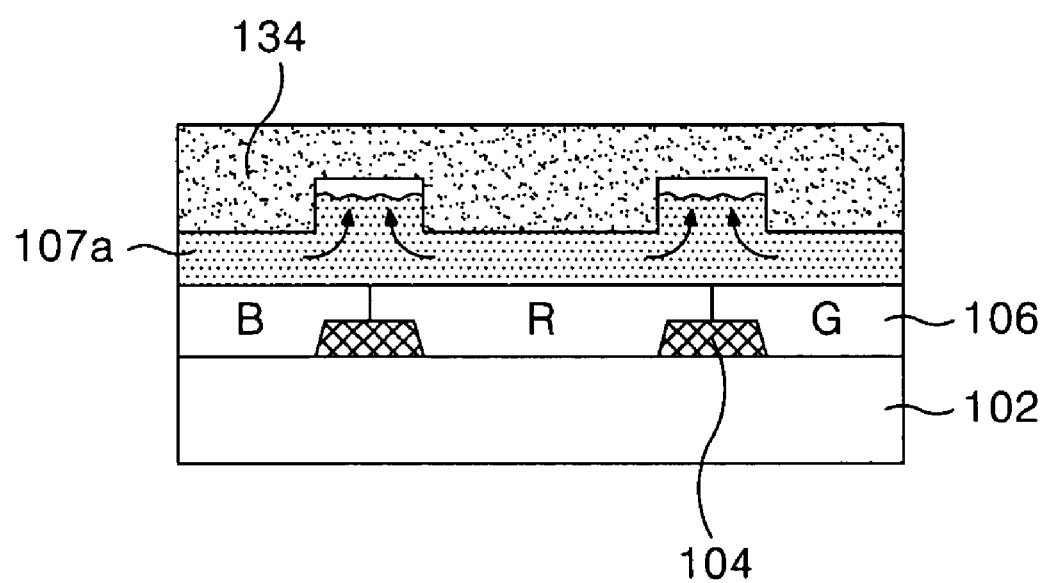
Figure 4D:
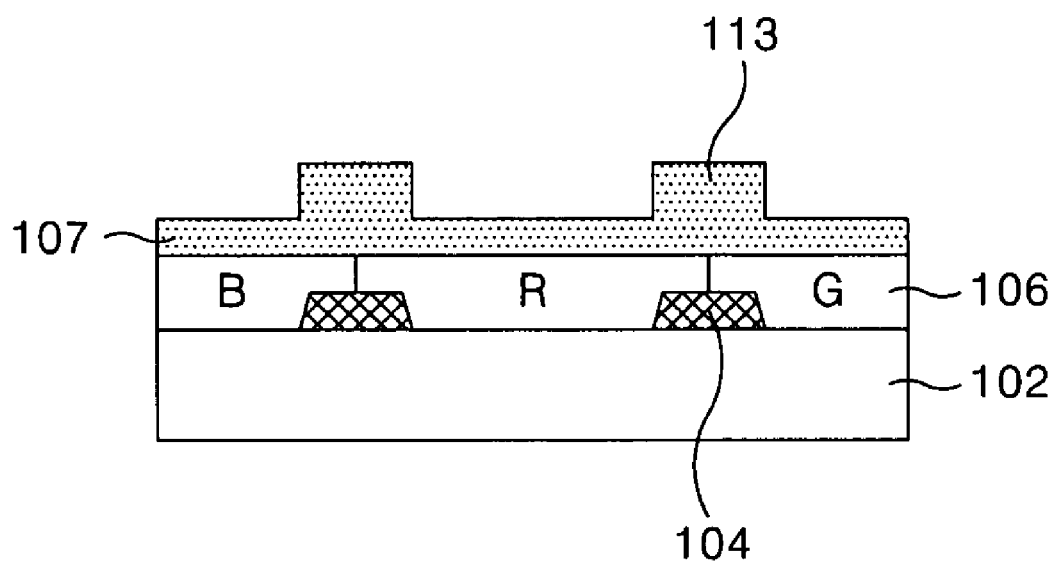

Referring to FIG. 4C, part of the flowable material 107a moves into the groove 134a of the soft mold 134 due to the pressure between the soft mold 134 and the substrate 102, a capillary force generated by surface tension, and a repulsive force between the soft mold 134 and the flowable material 107a. Then, the baking process is performed. The overcoat layer 107 and the spacer 113 are formed by the transfer of an inverse pattern from the groove 134a of the soft mold 134 to the flowable material 107a spread over the R, G, and B color filters 106 and the black matrix 104. Then, the soft mold 134 is separated from the flowable material 107a.

However, after repeated use of the soft mold, the thickness of the overcoat layer 107 can becomes non-uniform due to a process deviation when forming the spacer 113 and the overcoat layer 107. Specifically, the height of the overcoat layer 107 may vary between different LCD devices because of the deviation of the thickness of the spread flowable material 107a or the load applied to the flowable material by the soft mold 134.

Figure 5:
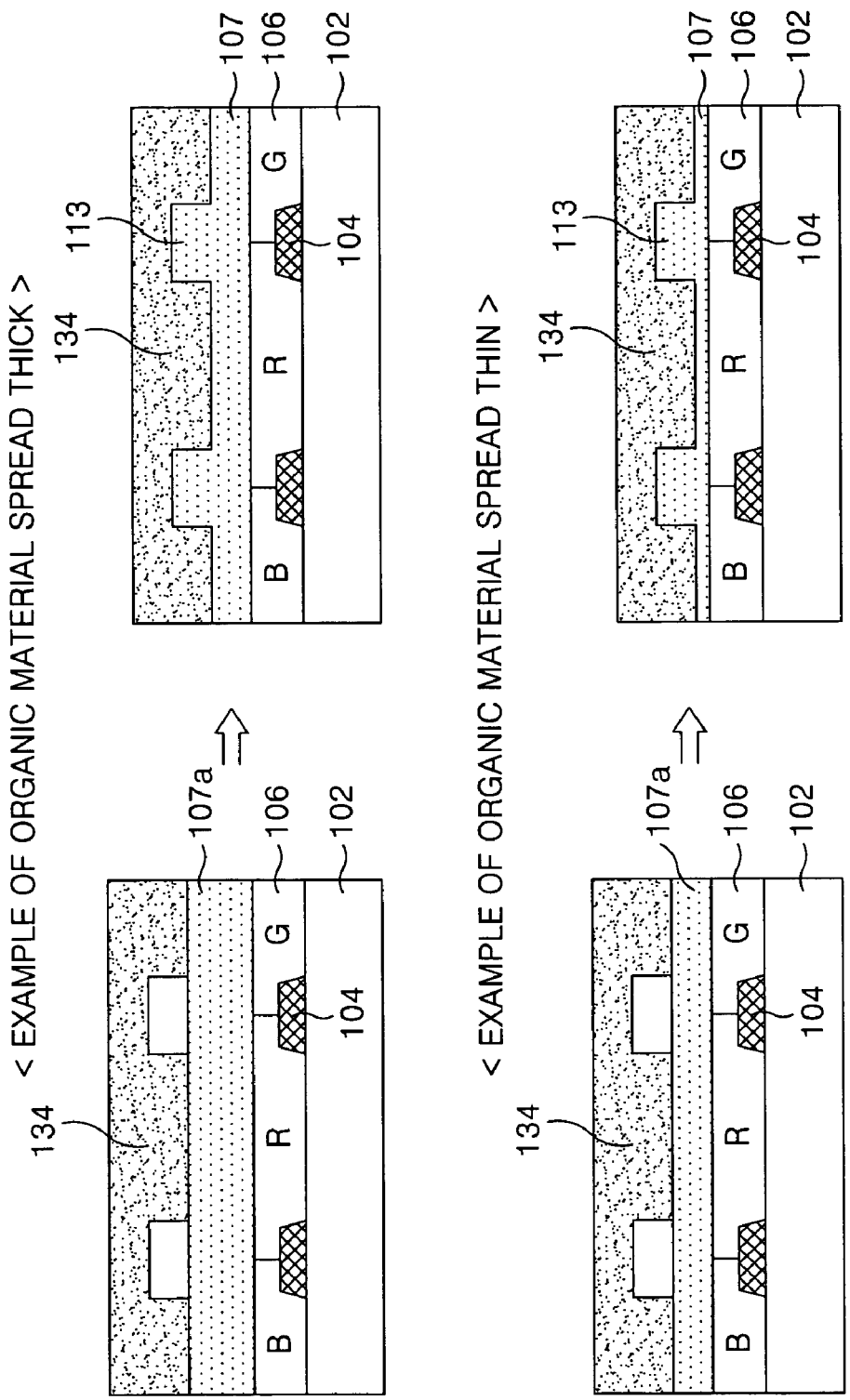
FIG. 5 shows variations in the thickness of an overcoat layer resulting from deviation in the spread of a flowable material over a substrate.

FIG. 5 shows variations in the thickness of an overcoat layer resulting from deviation in the spread of a flowable material over a substrate. Referring to FIG. 5, the flowable material 107a can be spread relatively thin or relatively thick depending on the amount of the flowable material 107a being spread. A thickly spread flowable material 107a leads to a thick overcoat layer 107 after pressing the soft mold 134 on the spread flowable material 107a. A thinly spread flowable material 107a leads to a relatively thin overcoat layer 107 after pressing the soft mold 134 on the spread flowable material 107a. Thus, the thickness of the formed overcoat layer 107 is affected by the amount of the flowable material 107a spread over the substrate 102.

Moreover, the thickness of the overcoat layer 107 is affected by the length of time the soft mold 107 exerts a pressure on the flowable material 107a. A thinner overcoat layer 107 is formed when the soft mold 134 exerts a pressure on the flowable material 107a for a longer time duration. Similarly, a thicker overcoat layer 107 is formed when the soft mold 134 exerts pressure on the spread flowable material 107a for a shorter time duration.

The non-uniform thickness of the overcoat layer 107 causes a non-uniform cell gap, thus degrading picture quality. To prevent the non-uniformity of a thin film pattern, such as the overcoat layer 107, an apparatus for fabricating a flat panel display including a thin film pattern with a substantially uniform thickness is proposed to include a soft mold having a multi-stepped profile. The apparatus for fabricating a flat panel display device includes a spreading device for spreading a flowable material, such as an organic material; a soft mold having a multi-stepped profile, for example a double-stepped profile; the soft mold pressing against the flowable material under its own weight to form an organic layer, for example; a baking device for baking the pressed organic layer; and a separating device for separating the soft mold from the formed organic layer.

Figure 6:
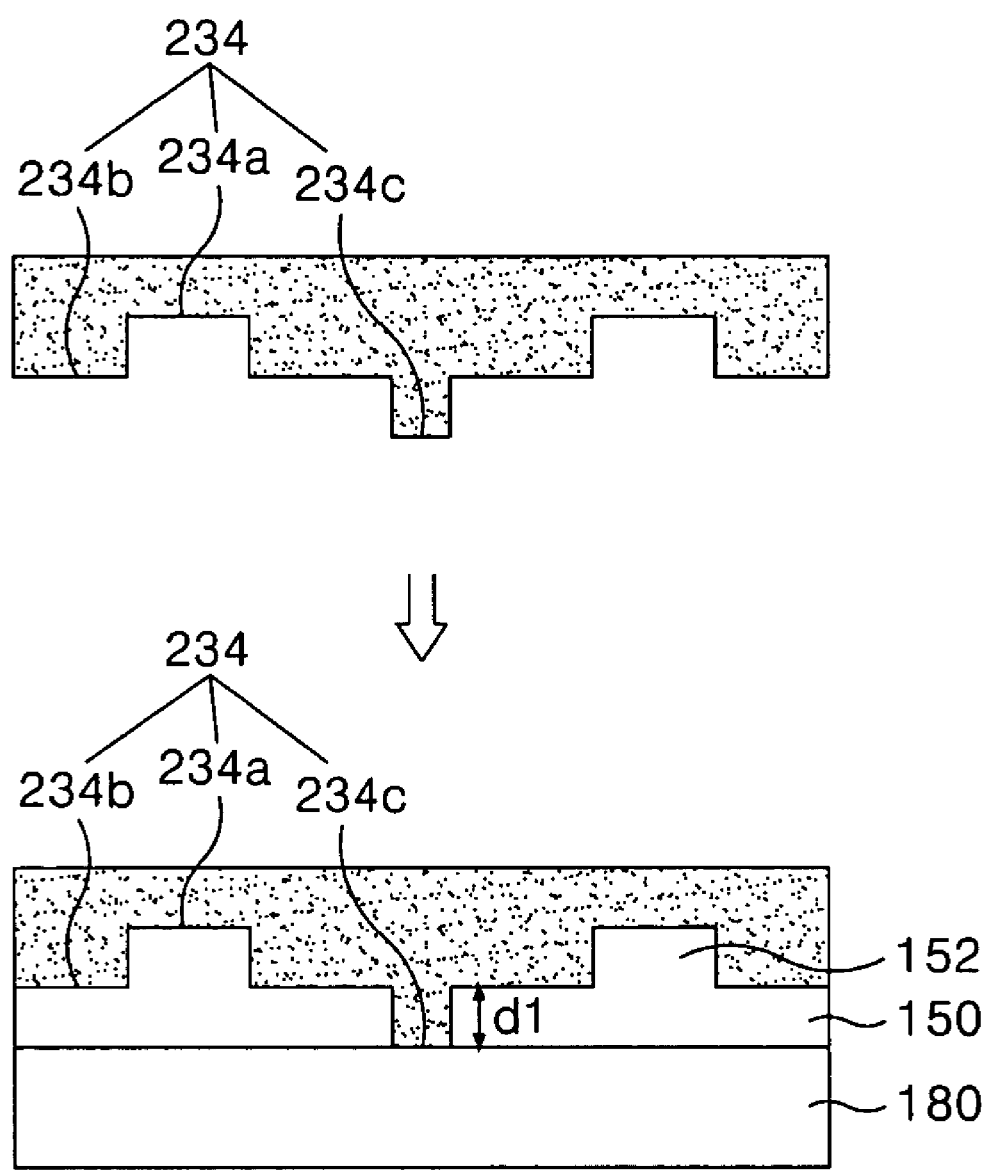
FIG. 6 shows an exemplary soft mold with a multi-stepped profile for an apparatus for fabricating a flat panel display device and an exemplary process of forming a thin film pattern using the soft mold according to another embodiment of the present invention.

FIG. 6 shows an exemplary soft mold with a multi-stepped profile for an apparatus for fabricating a flat panel display device and an exemplary process of forming a thin film pattern using the soft mold according to another embodiment of the present invention. Referring to FIG. 6, a soft mold 234 has a groove 234a recessed in relation to a base surface 234b of the soft mold 234 and a protruding part 234c protruding from the base surface 234b of the soft mold 234. Thus, the soft mold 234 has a double-stepped profile, for example. The base surface 234b corresponds to a first thin film pattern which is to be formed on the substrate 180, the protruding part 234c controls the thickness (d1) of the first thin film pattern 150, and the groove 234a corresponds to a second thin film pattern 152 which is to be formed on the first thin film pattern 150.

The soft mold 234 having such a multi-stepped profile presses against a flowable material 150 spread over the substrate 180 under the soft mold's own weight. Thus, the soft mold 234 is in a pressure-applying contact with the flowable material 150. The flowable material 150 can be, for example, an organic material. Accordingly, the flowable material 150 moves into the groove 234a under a pressure generated by the soft mold 234's own weight. The protruding part 234c of the soft mold 234 comes in contact with the substrate 153 after a designated time duration. Then, a baking process is performed to simultaneously form a first thin film pattern 150 having the same height d1 as the protruding part 234c and a second thin film pattern 152 having the same height as the depth of the groove 234a.

Thus, a thickness (d1) of the first thin film pattern 150 is determined by the height (d1) of the protruding part 234c and does not change in the course that the process. The base surface 234b of the soft mold 234 corresponds to a first surface of the multi-stepped profile pattern, the height of the protruding part determines the thickness d1 between the first surface and the substrate 180, and the depth of the groove 234a corresponds to a second surface of the multi-stepped profile pattern higher than the first surface Accordingly, it is possible form a first thin film patterns 150 having a uniform thickness.

Figure 7:
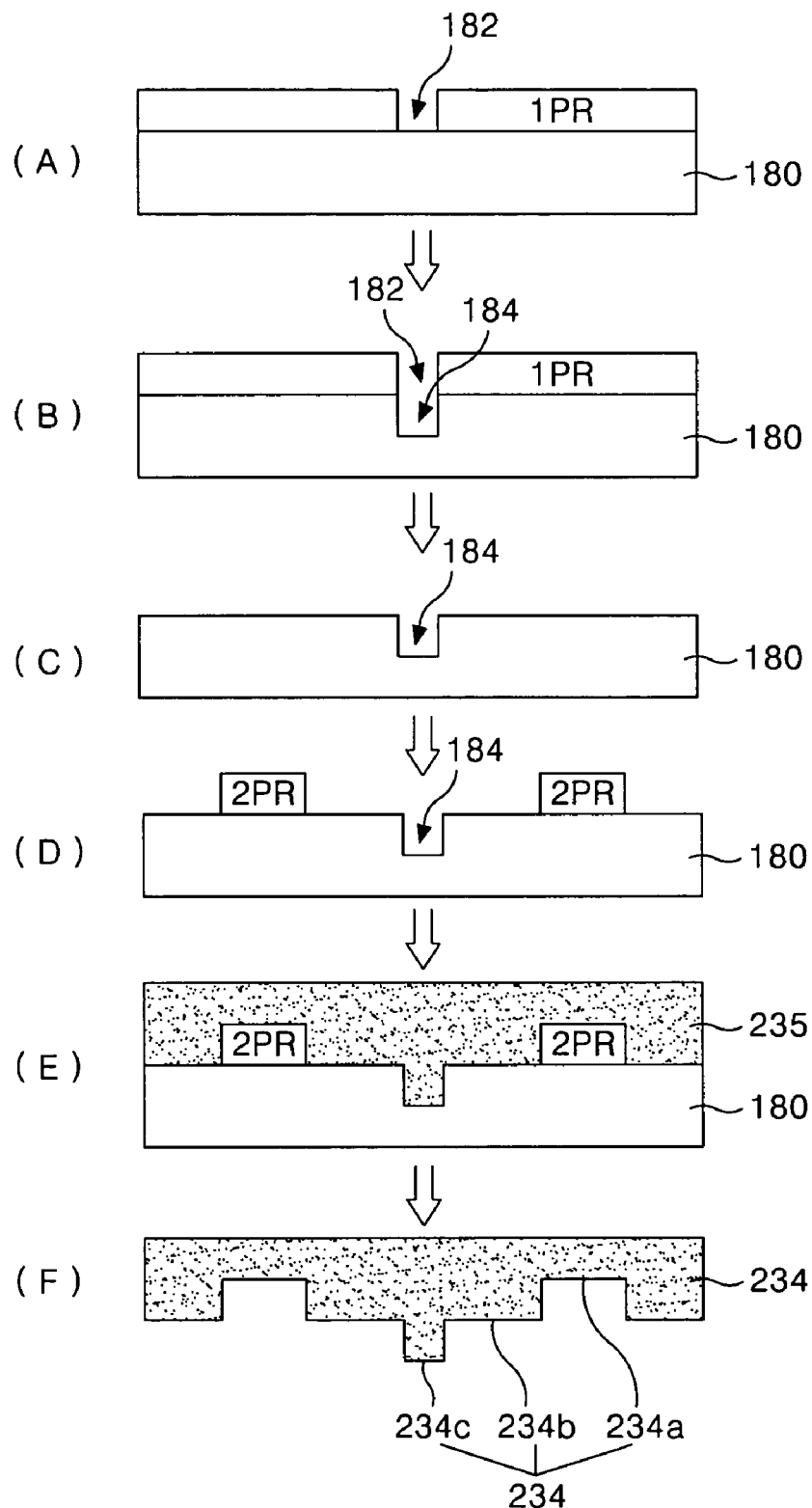
FIG. 7 shows exemplary steps in a method of fabricating the soft mold of FIG. 6 according to another embodiment of the present invention.

FIG. 7 shows exemplary steps in a method of fabricating the soft mold of FIG. 6 according to another embodiment of the present invention. Referring to FIG. 7, in a first step (A), a first mask is used to form a first photo-resist pattern 1PR on a substrate 180 using a photolithography process. The first photo-resist pattern 1PR includes a first hole 182 partially exposing the substrate 180. Then, in a second step (B), the portion of the substrate exposed through the first hole 182 is etched to a designated depth by an etching process to form a first groove 184 in the substrate to correspond to the first hole 182. The groove 184 is recessed to the inside of the substrate 180. In a third step (C), the first photo-resist pattern 1PR is removed by a stripping process.

As shown in the fourth step (D) in FIG. 7, a second mask is used to form a second photo-resist pattern 2PR. Then, in a fifth step (E), a forming material 235, such as polydimethylsiloxane PDMS, is spread on the substrate 180 including the second photo-resist pattern 2PR. The spread forming material 235 is caused to be hardened on the substrate 180. In a sixth step (F), the soft mold forming material 235 is separated from the second photo-resist pattern 2PR and the substrate 180, thereby forming the soft mold 234 having the double-stepped profile, for example.

Figure 8:
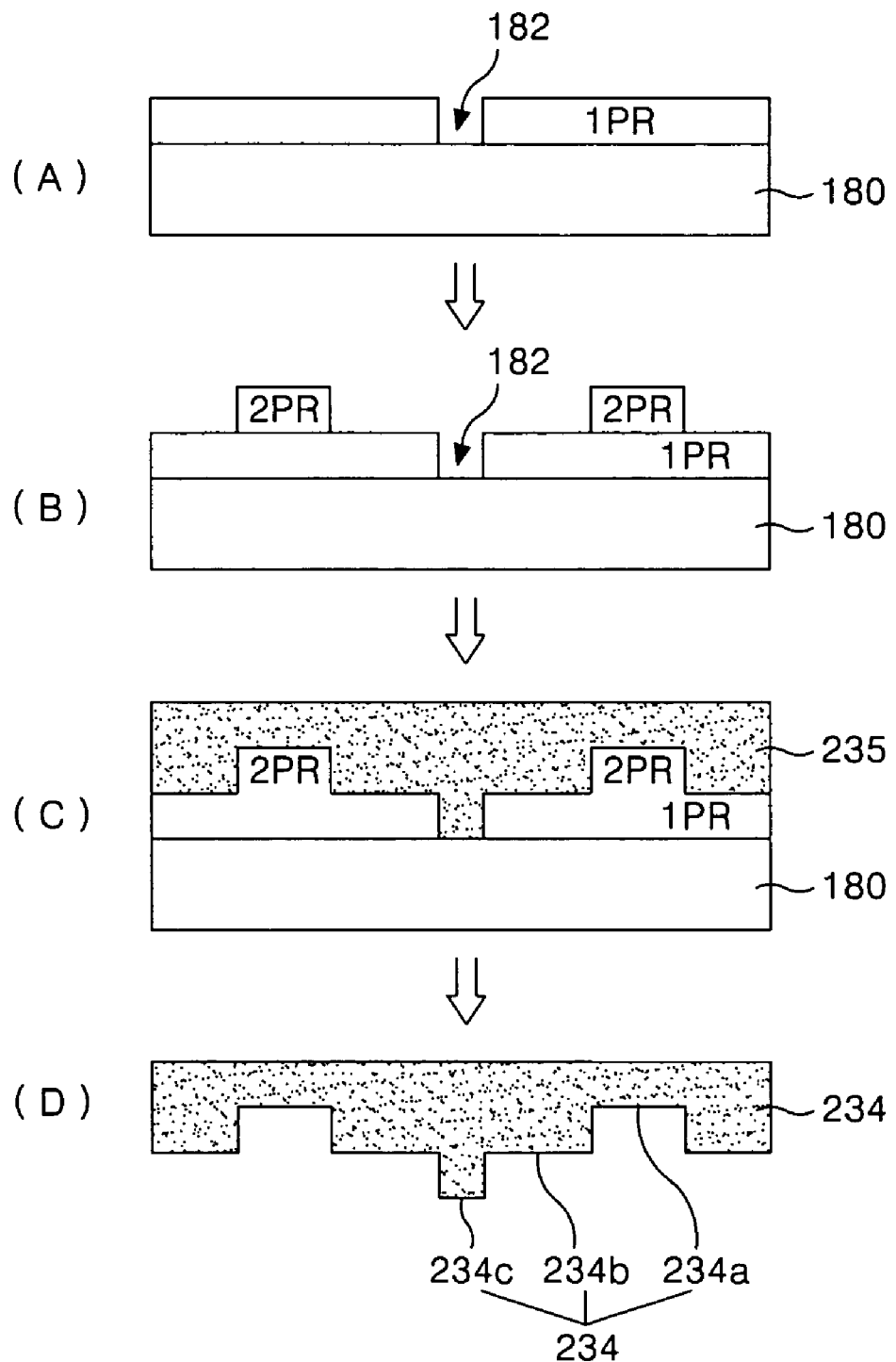
FIG. 8 shows exemplary steps in another method of fabricating the soft mold of FIG. 6 according to another embodiment of the present invention.

FIG. 8 shows exemplary steps in another method of fabricating the soft mold of FIG. 6 according to another embodiment of the present invention. Referring to FIG. 8, in a first step (A), a first mask is used to form a first photo-resist pattern 1PR on a substrate 180 using a photolithography process. The first photo-resist pattern 1PR includes a first hole 182 partially exposing the substrate 180. In a second step (B), a second photo-resist pattern 2PR is formed over the first photo-resist pattern 1PR using a photolithography process. The second photo-resist pattern 2PR has narrower line width and area than the first photo-resist pattern 1PR. In a third step (C), a material 235 suitable for forming the soft mold, such as polydimethylsiloxane PDMS, is spread on the substrate 180 where the first and second photo-resist patterns 1PR, 2PR are formed. The spread material 235 is caused to be hardened on the substrate 180. Then, in a fourth step (D), the hardened material 235 is separated from the first and second photo-resist patterns 1PR, 2PR and the substrate 180, thereby forming the soft mold 234 having the multi-stepped profile.

Figure 9A:
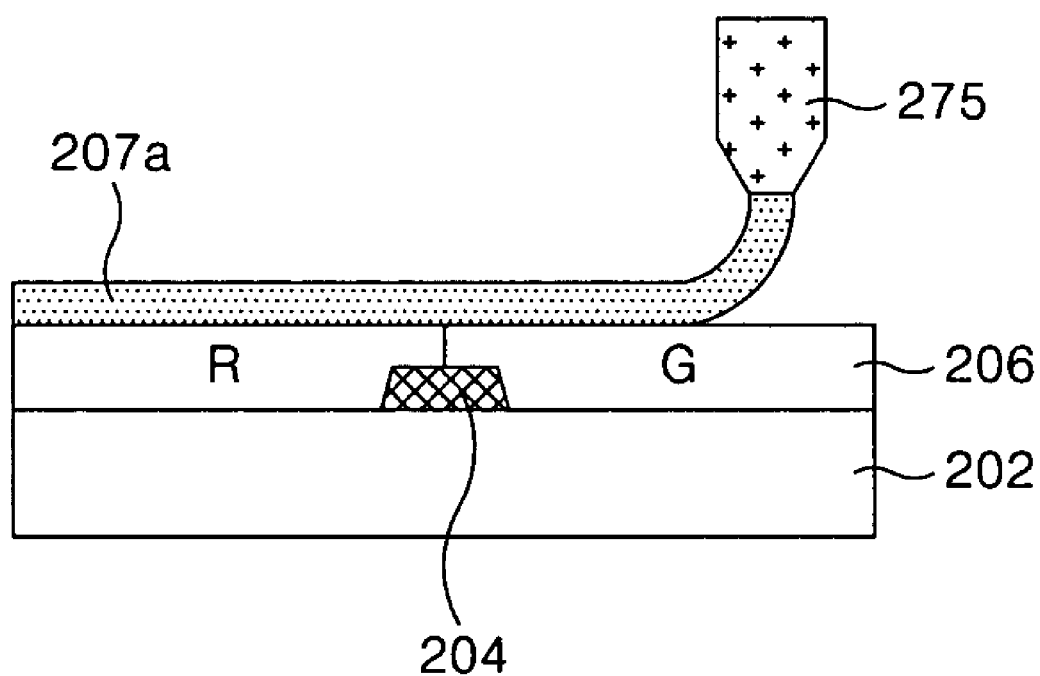
FIGS. 9A to 9D are diagrams showing exemplary steps of using the soft mold of FIG. 6 to form a spacer and an overcoat layer on a substrate of a flat panel display device in accordance with another embodiment of the present invention.

FIGS. 9A to 9D are diagrams showing exemplary steps of using the soft mold of FIG. 6 to form a spacer and an overcoat layer on a substrate of a flat panel display device in accordance with another embodiment of the present invention. Referring to FIG. 9A, a flat panel display device includes an upper substrate 202, color filters 206 on the upper substrate 102, including red (R), green (G) and blue (B) (not shown) filters, and a black matrix 204 between adjacent cell areas covered by the R, G, and B color filters. A flowable material 207a is spread over the color filters 206 including the black matrix 204. The flowable material 207a is spread by a method such as spin coating using a spreading device 275.

Figure 9B:
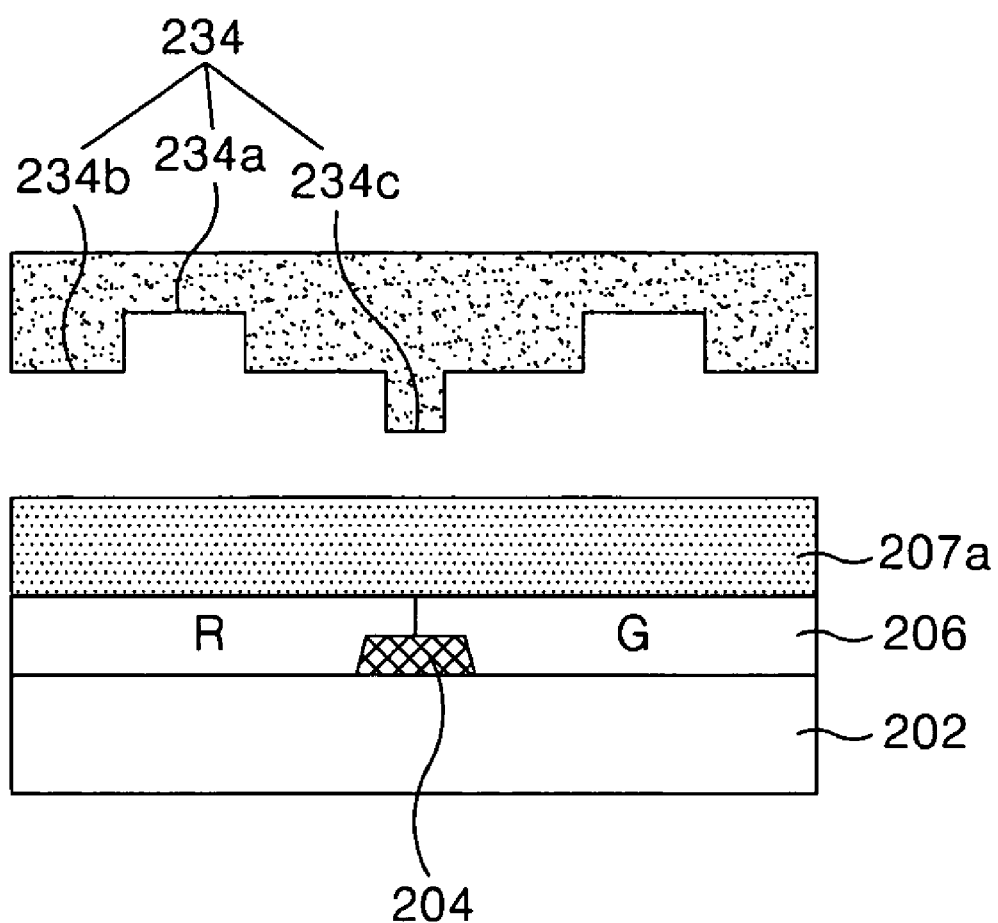

Referring to FIG. 9B, the soft mold 234 having the groove 234a, the base surface 234b and the protruding part 234c is aligned with the substrate 202 over the flowable material 207a. The groove 234a of the soft mold 234 corresponds to an area where a spacer is to be formed. The groove 234a of the soft mold 234 corresponds to an area where the spacer 213 is to be formed. The base surface 234b corresponds to an area where an overcoat layer is to be formed. The protruding part 234c controls the thickness of the overcoat layer 207. The soft mold 234 is made from a rubber material with high elasticity, e.g., polydimethylsiloxane PDMS, etc.

Figure 9C:
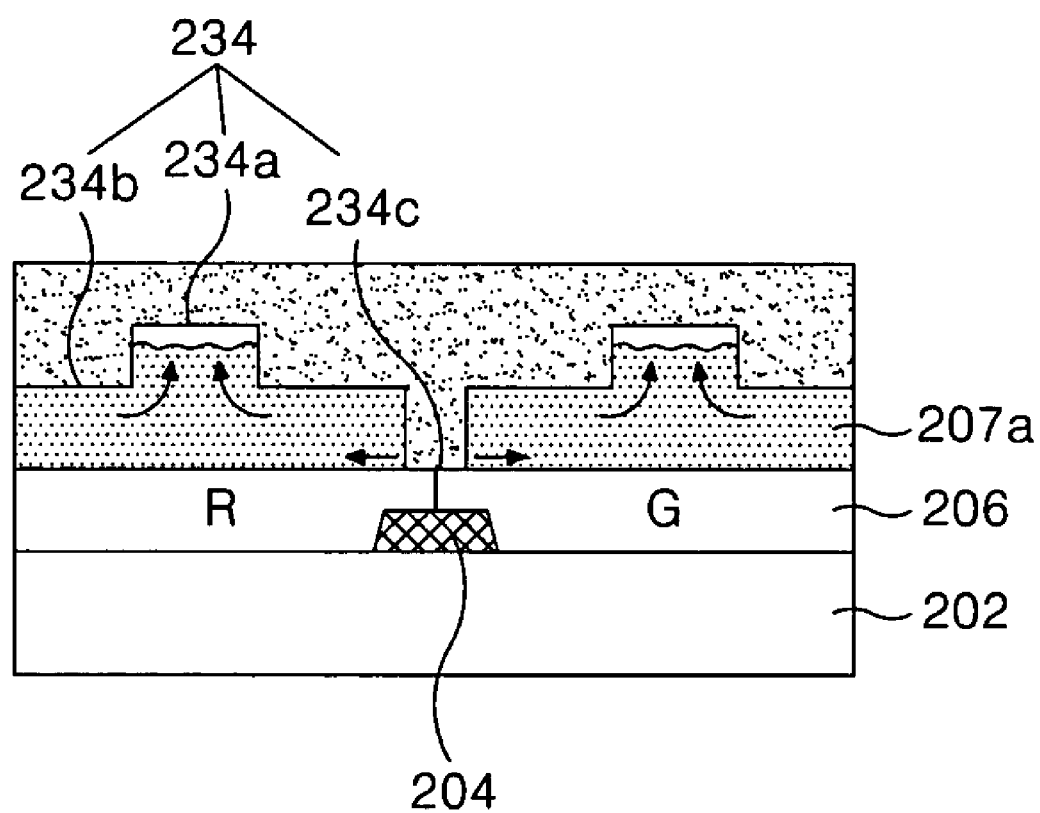

Referring to FIG. 9C, the soft mold 234 presses against the flowable material 207a under the soft mold 234's own weight to exert a pressure on the flowable material 207a for a designated time duration. Thus, the soft mold 234 is in a pressure-applying contact with the flowable material 207a. The pressure is applied until the protruding part 234c of the soft mold 234 comes in contact with the color filter 206. Then, the flowable material 207a is baked at a high temperature. Then, part of the flowable material 207a moves into the groove 234a of the soft mold 234 due to the pressure between the soft mold 234 and the substrate 202, a capillary force generated by surface tension and a repulsive force between the soft mold 234 and the flowable material 207a.

Figure 9D:
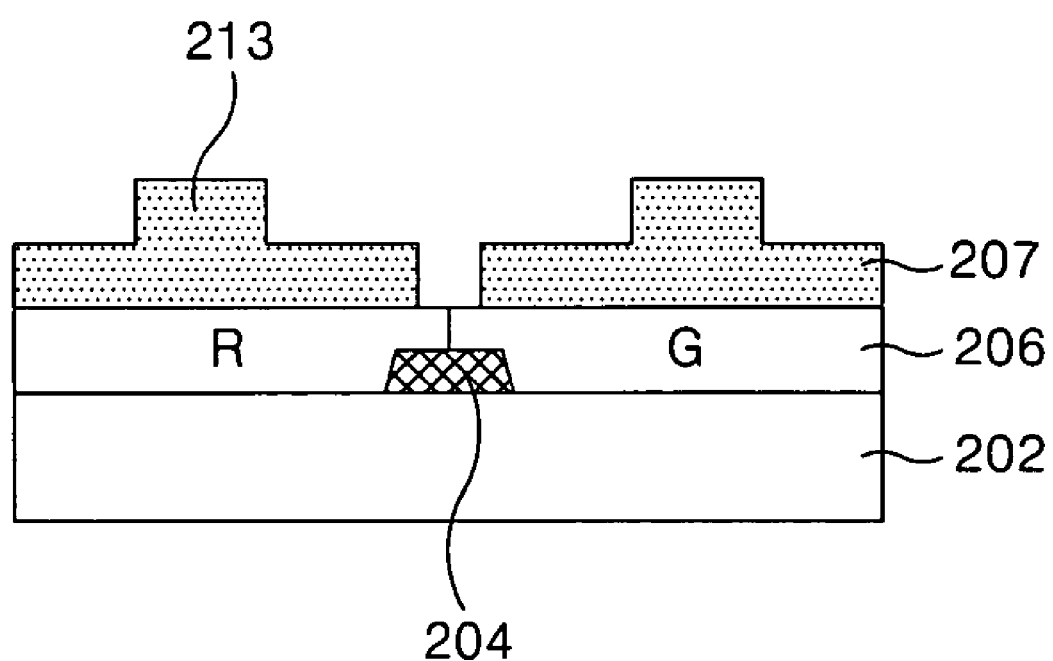

Then, as shown in FIG. 9D, the soft mold 234 is separated from the flowable material 207a. The resulting overcoat layer 207 and the spacer 113 are concurrently formed in accordance with the transfer of the pattern of the groove 234a of the soft mold 234 to the flowable material 207a. The thickness of the overcoat layer 207 is the same as the height of the protruding part 234c of the soft mold and the height of the spacer 213 is the same as the depth of the groove 234a of the soft mold 234. Moreover, the surface of the overcoat layer 207 corresponds to the base surface 234b of the soft mold. Accordingly, the overcoat layer 207 with uniform thickness can be formed.

Figure 10A:
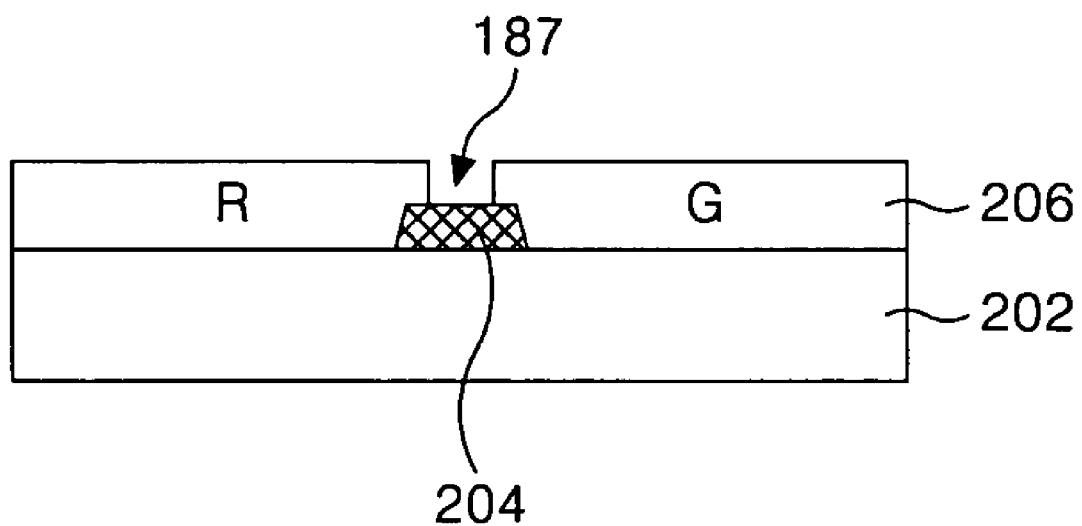
FIGS. 10A to 10E are diagrams showing exemplary steps of using the soft mold of FIG. 6 to form a spacer and an overcoat layer on a substrate of a flat panel display device in accordance with another embodiment of the present invention.

FIGS. 10A to 10E are diagrams showing exemplary steps of using the soft mold of FIG. 6 to form a spacer and an overcoat layer on a substrate of a flat panel display device in accordance with another embodiment of the present invention. Referring to FIG. 10A, a flat panel display device includes an upper substrate 202, color filters 206 on the upper substrate 102, including red (R), green (G) and blue (B) (not shown) filters, and a black matrix 204 between adjacent cell areas covered by the R, G, and B color filters. The black matrix 204 is partially exposed by a hole 187 through the color filters 206.

Figure 10B:
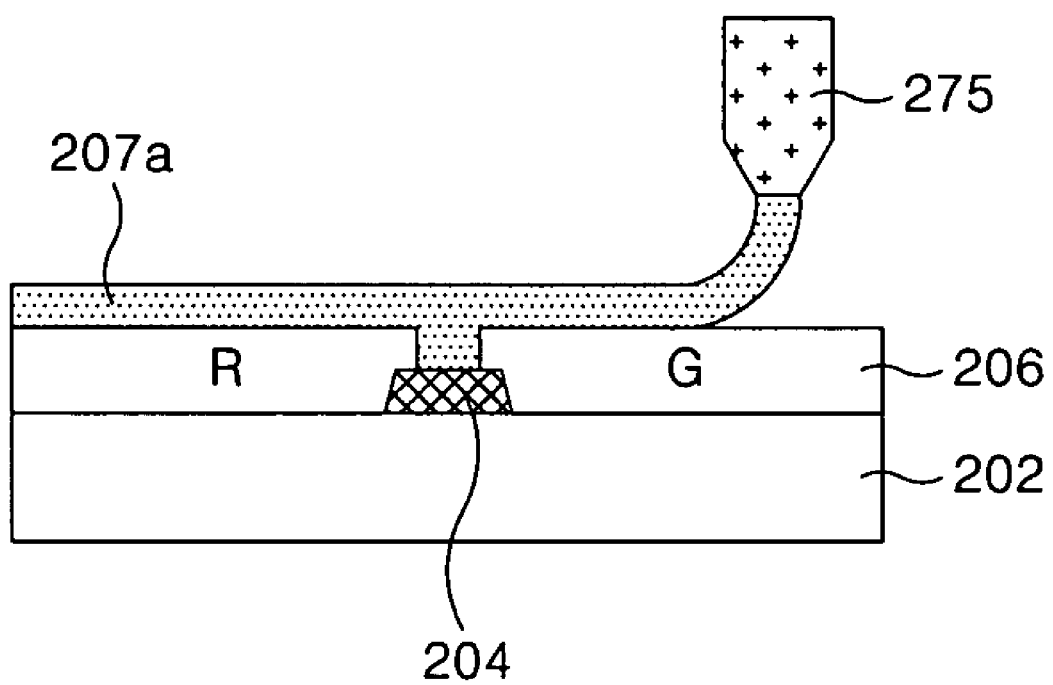

Referring to FIG. 10B, a flowable material 207a is spread over the color filters 206 and contacting the black matrix 204 through the hole 187. The flowable material 207a is spread by a method such as spin coating using a spreading device 275. The flowable material 207a can be, for example, an organic material.

Figure 10C:
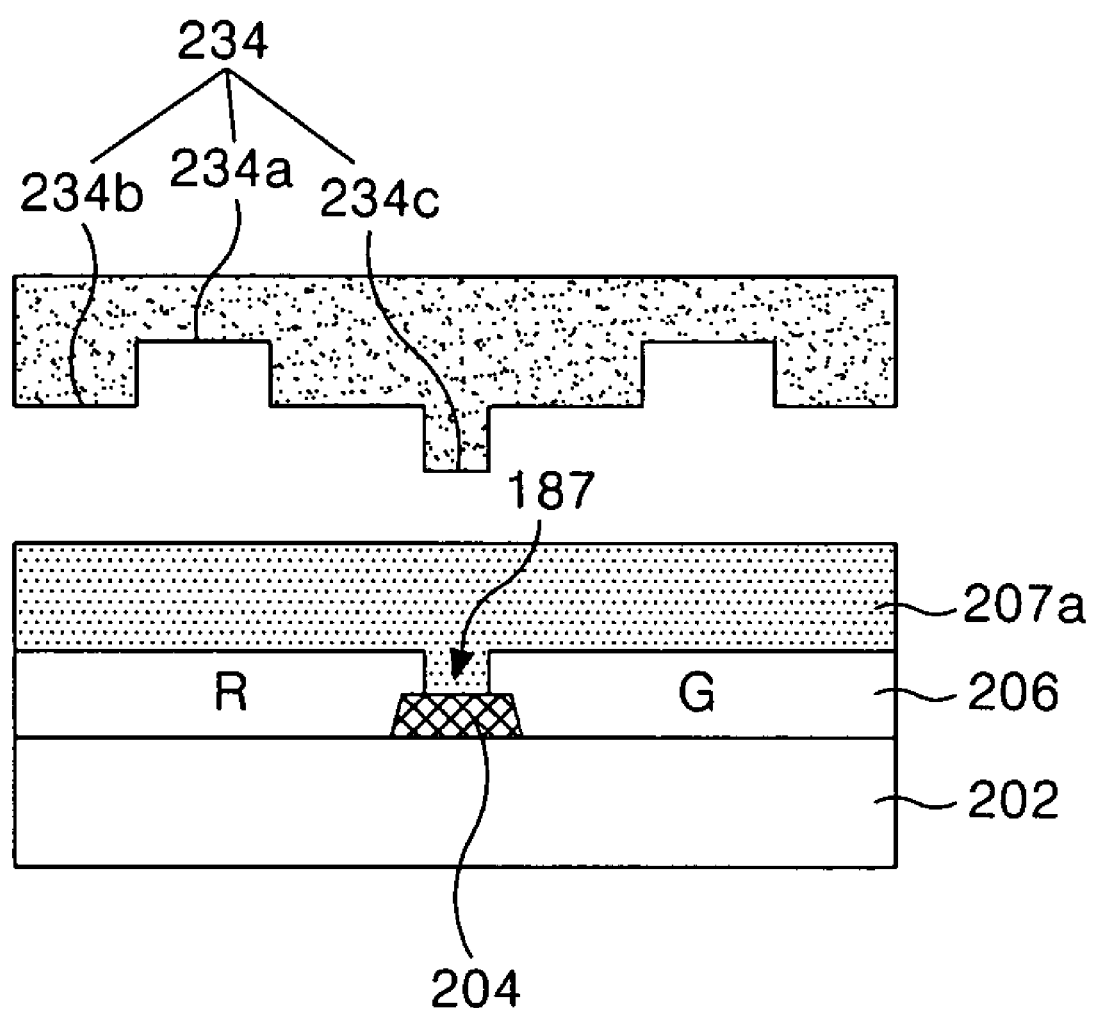

Referring to FIG. 10C, the soft mold 234 having the groove 234a, the base surface 234b and the protruding part 234c is aligned with the substrate 202 over the flowable material 207a. The groove 234a of the soft mold 234 corresponds to an area where a spacer is to be formed. The groove 234a of the soft mold 234 corresponds to an area where the spacer 213 is to be formed. The base surface 234b corresponds to an area where an overcoat layer is to be formed. The protruding part 234c is aligned to face the hole 187 and the exposed the black matrix 204 through the hole 187.

Figure 10D:
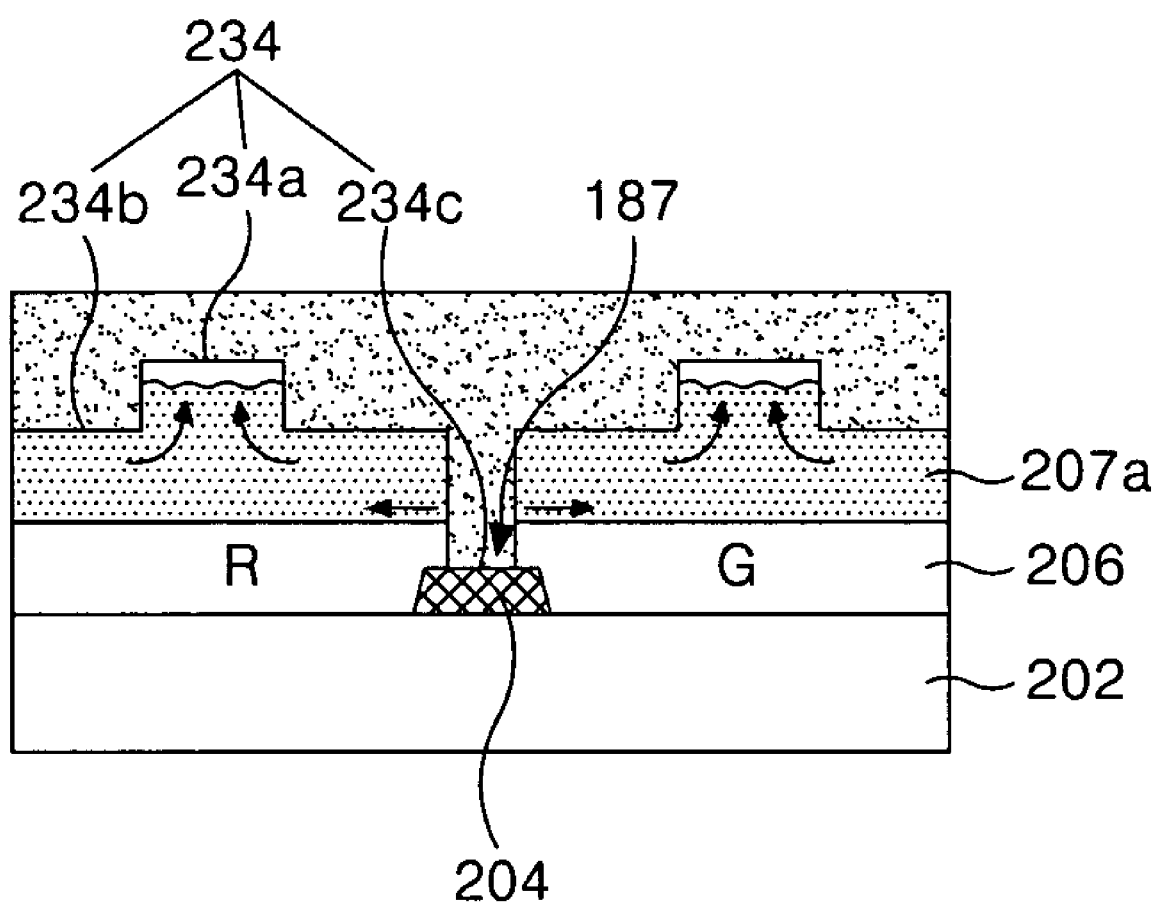

Referring to FIG. 10D, the soft mold 234 presses against the flowable material 207a under the soft mold 234's own weight to exert a pressure on the flowable material 207a for a designated time duration. Thus, the soft mold 234 is in a pressure-applying contact with the flowable material 207a. The pressure is applied until the surface of the protruding part 234c of the soft mold 234 comes in contact with the black matrix 204 through the second hole 187 which penetrates the color filter 206. Then, the flowable material 207a is baked at a high temperature. Then, part of the flowable material 207a moves into the groove 234a of the soft mold 234 due to the pressure between the soft mold 234 and the substrate 202, a capillary force generated by surface tension and a repulsive force between the soft mold 234 and the flowable material 207a.

Figure 10E:
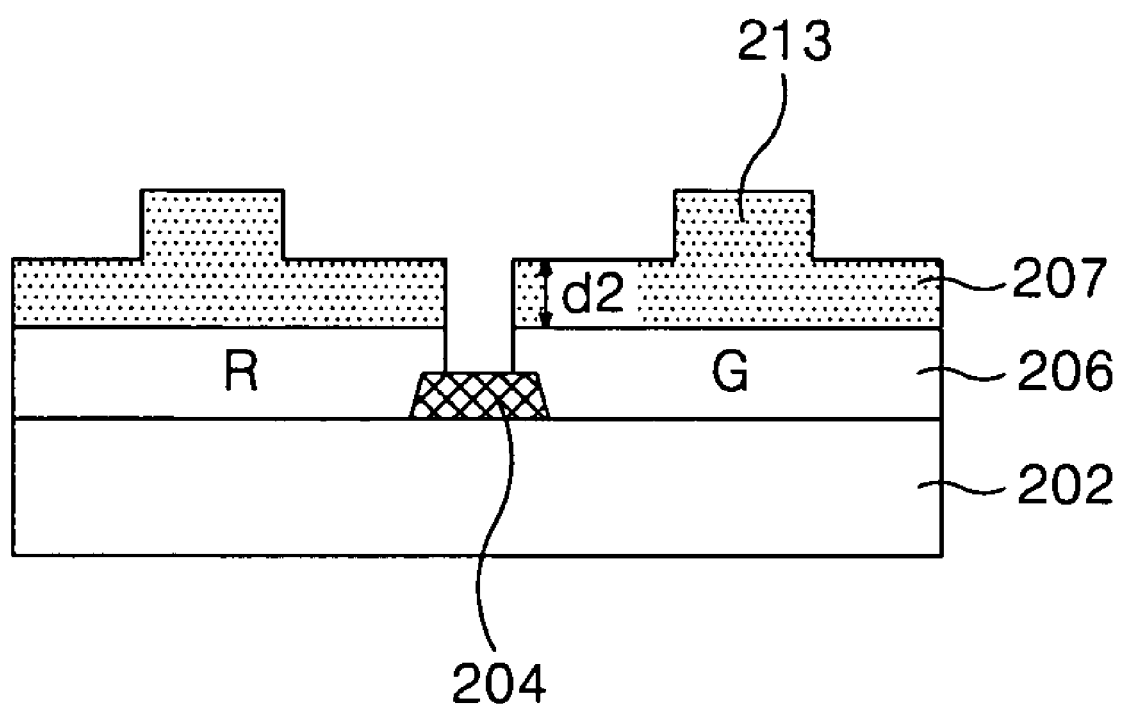

Then, as shown in FIG. 10E, the soft mold 234 is separated from the flowable material 207a. The resulting overcoat layer 207 and the spacer 113 are concurrently formed in accordance with the transfer of the pattern of the groove 234a of the soft mold 234 to the flowable material 207a. The height of the spacer 213 is the same as the depth of the groove 234a of the soft mold 234. The thickness d2 of the overcoat layer 207 is the same as a height difference between the height of the second hole 187 and the height of the protruding part 234c of the soft mold 234. Accordingly, the overcoat layer 207 with uniform thickness can be formed.

Figure 11:
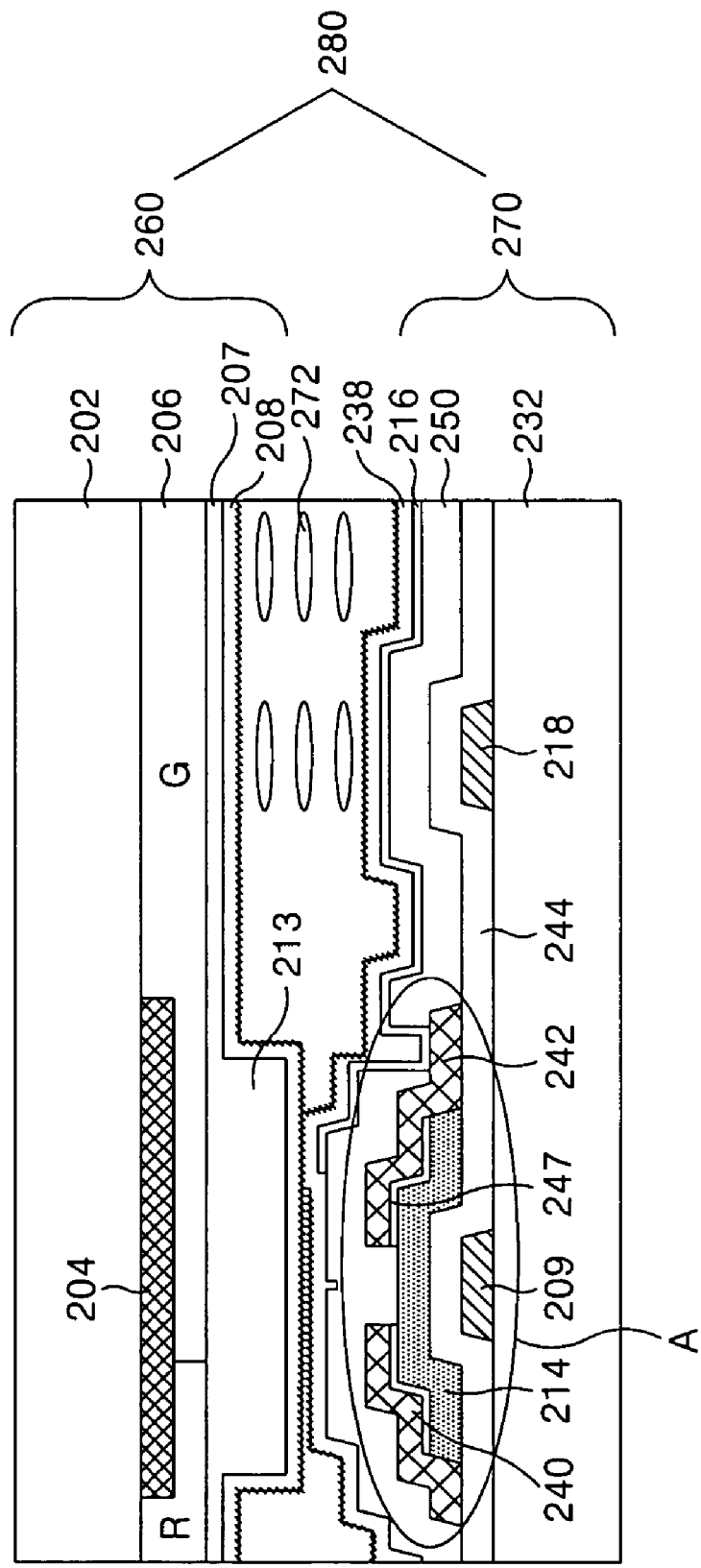
FIG. 11 is a cross sectional view representing an exemplary liquid crystal display device fabricated in accordance with an embodiment of the present invention.

FIG. 11 is a cross sectional view representing an exemplary liquid crystal display device fabricated in accordance with an embodiment of the present invention. Referring to FIG. 11, an IPS mode LCD panel 280 includes an upper array substrate 202 (or color filter array substrate). A black matrix 204, a color filter 206, an overcoat layer 207, a spacer 213 and an upper alignment film 208 are sequentially formed on the upper substrate 202. The IPS mode LCD panel 280 also includes a lower array substrate (or thin film transistor array substrate 270. A thin film transistor ('TFT'), a common electrode 218, a pixel electrode 216 and a lower alignment film 238 are formed on the lower substrate 232. A liquid crystal material 272 is injected into an inner space between the upper array substrate 260 and the lower array substrate 270.

In the upper array substrate 260, the black matrix 204 is formed to overlap a TFT area (A) of the lower substrate 232 and an area of gate lines and data lines (not shown) for dividing a cell area where the color filter 206 is to be formed. The black matrix 204 prevents light leakage and absorbs an external light, thereby acting to increase the contrast of the LCD panel. The color filter 206 is formed in the cell area divided by the black matrix 204. The color filter 206 includes R, G, B color filters to display images.

The overcoat layer 207 covers the color filter 206, thereby leveling the upper substrate 202. The column spacer 213 maintains a cell gap between the upper substrate 202 and the lower substrate 232. The overcoat layer 207 and the column spacer 213 are simultaneously formed using a soft mold 234 to apply a pressure on a flowable material in accordance with one of the methods described above in reference to FIGS. 9A to 10E. The overcoat layer 207 and the column spacer 213 are made from a flowable material which can be hardened by heat or light.

The TFT formed in the lower array substrate 270 includes a gate electrode 209 formed on the lower substrate 232 along with the gate line (not shown); a gate insulating film 244 over the gate electrode 209, a semiconductor layer 214, 247 overlapping the gate electrode 209 and over the gate insulating film 244; and a source/drain electrode 240, 242 formed along with the data line (not shown) with the semiconductor layer 214, 247 therebetween. The TFT supplies a pixel signal from the data line to the pixel electrode 216 in response to a scan signal from the gate line. The pixel electrode 216 is made from a transparent conductive material with high light transmittance and contacts the drain electrode 242 of the TFT with a passivation film 250 therebetween. A common electrode 218 is formed in a stripe shape alternating with the pixel electrode 216. The common electrode 218 supplies a common voltage which becomes a reference voltage when driving the liquid crystal. The liquid crystal rotates on the basis of a horizontal direction by a horizontal electric field with a pixel voltage supplied to the pixel electrode 216.

Upper/lower alignment films 208, 238 for aligning the liquid crystal material 272 are formed by a rubbing process after spreading an alignment material such as polyimide.

In accordance with an embodiment of the present invention, a thin film pattern is formed by a patterning process using a soft mold having a protruding part to determine the thickness of the thin film pattern. Accordingly, it is possible to form an overcoat layer having a uniform thickness and simplify the fabricating process of the flat panel display device.

In accordance with an embodiment of the present invention, a spacer and an overcoat layer can be concurrently formed using a soft mold in an ECB (electrically controlled birefringence) and a VA (vertical alignment) mode LCD devices as well as an IPS mode LCD device and a TN mode LCD device. Moreover, the above-described processes, in accordance with embodiments of the present invention, can be used for forming the thin film patterns where two organic layers are continuously in contact with each other, for example in field emission display FED, plasma display panel PDP, electro luminescence EL, etc.

In accordance with embodiments of the present invention, a thin film pattern is formed by a patterning process using a soft mold with a protruding part, which can determine the thickness of the thin film pattern. Accordingly, an overcoat layer having a uniform thickness can be formed and the fabricating process of the flat panel display device can be simplified.

It will be apparent to those skilled in the art that various modifications and variations can be made in the apparatus for fabricating a flat panel display device, the method of fabricating the same, and the method of fabricating a flat panel display device using the same of the present invention without departing from the spirit or scope of the invention. Thus, it is intended that the present invention cover the modifications and variations of this invention provided they come within the scope of the appended claims and their equivalents.

What is claimed is:

1. A method of fabricating a flat panel display device, comprising: applying a second material layer of an organic material on a first material layer; applying the soft mold to the organic material to form a multi-stepped profile pattern in the second material layer, the soft mold having a base surface, a groove part recessed in relation to the base surface, and a protruding part protruding from the base surface; and separating the soft mold from the multi-stepped profile pattern of the second material layer, wherein the soft mold applies pressure to the second material layer under its own weight; wherein the multi-stepped profile pattern of the second material layer includes a first pattern on the first material layer corresponding to the base surface of the soft mold and a second pattern on the first pattern corresponding to the groove of the soft mold, the first and second patterns being directly patterned by the soft mold and being predetermined patterns which remain as part of the flat panel display device, wherein a height of the protruding part determines a thickness of the first pattern which remains in the flat panel display device by the protruding part directly contacting the first material layer through the first pattern, wherein the first pattern which remains in the flat panel display device includes a hole, wherein the hole corresponds to the protruding part of the soft mold and is formed at inner portion of the first pattern by the protruding part directly contacting the first material layer through the first pattern and wherein the first material layer is a color filter, the first pattern is an overlay layer, the second pattern is a spacer and the protruding part of the mold corresponds to a hole exposing a black matrix.

2. The method of claim 1, wherein the second pattern has a smaller area than the first pattern, the hole has a smaller area than the first and second pattern, respectively, and the protruding part has a smaller area than the base surface and the groove part, respectively.

3. The method of claim 1, wherein the soft mold includes at least one of Polydimethylsiloxane PDMS, Polyurethane, and cross-linked Novolac resin.

4. The method of claim 1, wherein the flat panel display device includes one of a liquid crystal display device, field emission display device, plasma display panel device, and an electro luminescence display.

* * * * *